United States Patent Office 3,485,742
Patented Dec. 23, 1969

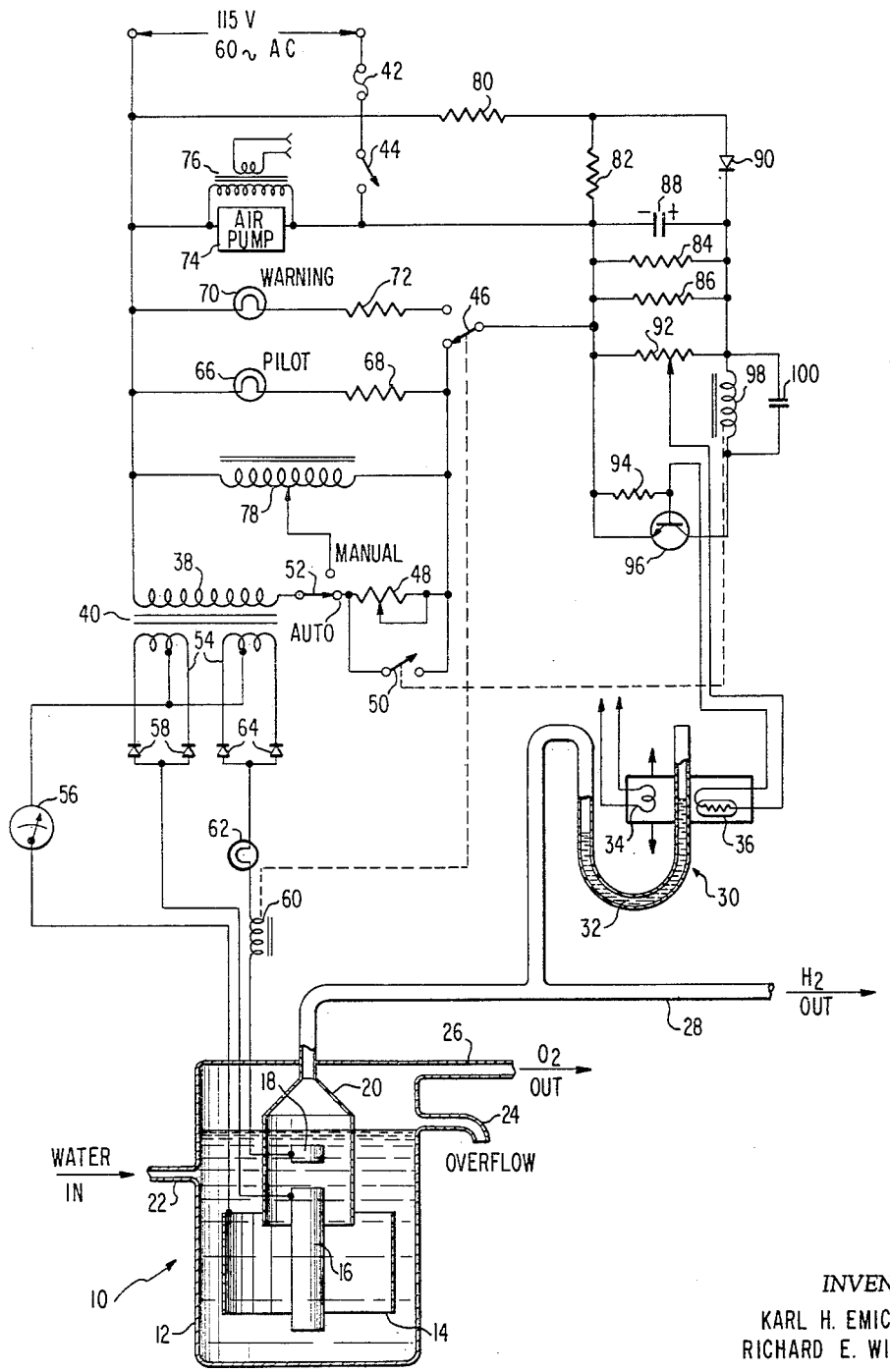

3,485,742
PRESSURE RESPONSIVE CONTROL CIRCUIT FOR AN ELECTROLYSIS-TYPE HYDROGEN GENERATOR
Karl H. Emich, Decatur, and Richard E. Wiley, Tuscola, Ill., assignors to National Distillers & Chemical Corporation, New York, N.Y.
Filed May 10, 1967, Ser. No. 637,511
Int. Cl. B01k 3/00
U.S. Cl. 204—230
6 Claims

ABSTRACT OF THE DISCLOSURE

An electronic circuit for controlling the current supplied to an electrolysis-type hydrogen generator in response to the pressure of the generated hydrogen. The level of the liquid in a manometer pressure gauge is sensed by a light bulb-photocell, and the voltage drop across the photocell controls the conduction of a transistor in a relay circuit. The relay controls the current through the primary winding of a transformer whose secondary winding supplies current to the hydrogen generator electrodes.

CROSS-REFERENCES TO RELATED PATENTS

U.S. Patent No. 3,266,292, issued to Robert L. Bailey on Aug. 16, 1966, and entitled. "Method for Detecting Volatile Organic Contaminants in Reuseable Containers."

BACKGROUND OF THE INVENTION

This invention relates in general to hydrogen generators and more particularly to a novel electronic circuit for controlling the magnitude of the current supplied to the electrodes of such a generator in response to the generated gas pressure.

Hydrogen generators of the electrolysis type are well known in the prior art and generally involve the passage of an electric current between spaced electrodes disposed in an aqueous solution. The current ionizes the water molecules and the positively charged hydrogen ions migrate to the negative electrode or cathode while the negatively charged oxygen ions collect on the positive electrode or anode. The hydrogen ions undergo a reduction at the cathode as they acquire electrons to neutralize their positive charges, form bubbles of hydrogen gas, and rise to the surface of the liquid where they may be collected and drained off.

When such generators are used to supply hydrogen to a flame detector, as in the contamination detection system disclosed in the above referenced patent, the hydrogen demand of the detector depends on a number of variable factors, including the ambient temperature. In the past, it has been proposed to regulate the hydrogen generator output in response to the demand of the system by sensing the hydrogen pressure in the output line of the generator, which varies in direct proportion to demand, and controlling the current through the generator in response to the pressure. Many problems have been encountered in implementing such an arrangement, however, in that the usual pressure sensing devices are too insensitive and the current control means have too much inertia or output lag. The result is that the output pressure tends to hunt or oscillate about the desired level over a dangerously wide range, which often produces a run-away condition and system shutdown or failure.

SUMMARY OF THE INVENTION

This invention overcomes the problems outlined above by providing a novel hydrogen generator control circuit characterized by a photoelectrically detected liquid manometer pressure gauge, a transistorized relay circuit responsive to the photo-electric cell of the pressure gauge, and a current regulating means controlled by the relay circuit for controlling the current supplied to the electrodes of the hydrogen generator. The overall arrangement is simple in design, relatively free of moving parts, and permits easy adjustment of the desired hydrogen output pressure which is to be maintained. Experimental results show that the control circuit of this invention maintains the output pressure to within ±.015 inch of water, whereas the most accuracy that could be achieved with the prior art arrangements was ±.35 inch of water.

BRIEF DESCRIPTION OF THE DRAWINGS

The foregoing and other objects, features and advantages of the invention will be apparent from the following more particular description of a preferred embodiment of the invention, as illustrated in the accompanying drawings, in which the single figure shows a schematic diagram of the electronic control circuit of this invention.

DESCRIPTION OF THE PREFERRED EMBODIMENT

Referring to the drawing, hydrogen is produced in an electrolysis-type generator 10 which includes a fluid container 12, a ring-shaped anode 14, shown in cutaway, a rod-shaped cathode 16, an auxiliary cathode 18 and a funnel-shaped hydrogen collector 20. Water is admitted to the container at 22 and rises to the level of the overflow line 24. The particular generator 10 shown forms no part of the present invention and any suitable type of electrolysis generator known in the art could be used. Oxygen is taped off from the top of the container at 26 and the hydrogen produced is drained ofl via output line 28 which leads to a utilization device, in this case a flame detector as described in the above referenced patent. A branch in the output line 28 communicates with a U tube manometer pressure gauge 30 filled with a suitable liquid 32, such as water. The level of the liquid in one arm of the tube is sensed by a light bulb 34 cooperating with a photocell 36. The housing containing the bulb and the photocell is slidable up and down the tube arm to adjust the hydrogen pressure level as will be more apparent later on.

Power is suplied to the system from a 115 volt 60 cycle AC source as shown and flows to the primary winding 38 of power transformer 40 through the path including fuse 42, on-off switch 44, relay switch 46, either potentiometer 48 or relay switch 50, and option switch 52. The split secondary windings 54 of transformer 40 are connected to the anode 14 of hydrogen generator 10 through an ammeter 56, which may be calibrated to yield an instantaneous indication of the rate of hydrogen generation in milliliters per minute. One of the secondary windings 54 is connected directly to cathode 16 through diode rectifiers 58, while the other secondary winding 54 is connected to auxiliary cathode 18 through a relay coil 60, a current regulating lamp 62 and diode rectifiers 64.

In normal operation, with on-off switch 44 closed, a pilot light 66 is energized through resistor 68. If the water supply is interrupted, however, and the level in container 12 falls below auxiliary cathode 18, relay coil 60 is deenergized and its associated switch 46 transfers to its uper contact, which extinguishes pilot light 66 and energizes a warning light 70 through resistor 72, thereby signalling the operator of the low water condition.

An air pump 74 is also connected across the AC power supply to draw air samples into the contamination detection apparatus. A transformer 76 is connected across the air pump to supply an energizing signal to light bulb 34 at the manometer. Manual control of the hydrogen generator 10 may be effected by transferring option switch 52 from its automatic to its manual contact and adjusting auto transformer 78.

Resistors 80, 82, 84 and 86, capacitor 88 and diode 90 constitute a DC power supply network for the transistorized relay control circuit including potentiometer 92, biasing resistor 94, NPN transistor 96, relay coil 98 and capacitor 100.

In operation, assume that the demand of the flame detector temporarily increases, drawing off a greater volume of hydrogen and thus lowering the hydrogen pressure. The liquid level of the manometer tube then drops and the photocell 36 is illuminated by light source 34. This lowers the resistance of the photocell to the kilohm range which increases the positive bias on the base of transistor 96, rendering the latter conductive. Relay coil 98 is thus energized and transfers its associated switch arm 50 to the closed position. This short circuits potentiometer 48 which increases the current through the primary winding of transformer 40 and causes a correspondingly greater current to flow through secondary windings 54 to the hydrogen generator electrodes 14, 16 and 18. The hydrogen output of the generator is thus increased, the hydrogen pressure increases, and the liquid 32 in the manometer tube rises to once more block the light source from photocell 36.

The circuit now cycles in the reverse direction with the resistance of the photocell increasing to the megohm range to lower the bias on transistor 96 and render the latter nonconductive. Relay coil 98 is de-energized, opens its switch arm 50, and the potentiometer 48 is again placed in the circuit to reduce the current through transformer 40 and ultimately reduce the hydrogen output.

The circuit continuously cycles in the manner decribed above over a range of .03 inch of water, which is well within the acceptable variation limits for most requirements. It would, of course, be possible to include damping or rate means in the circuit as well as integrating or reset means to cause the hydrogen pressure to accurately track the demand, as is well known in the servo arts, and the provision of such additional means is intended to be within the scope of this invention.

While the invention has been particularly shown and described with reference to preferred embodiments thereof, it will be understood by those skilled in the art that various changes in form and details may be made therein without departing from the spirit and scope of the invention.

What is claimed is:

1. A pressure responsive control circuit for an electrolysis-type hydrogen generator having anode and cathode electrodes and means for collecting generated hydrogen gas and supplying same to an output line, and including a source of electrical power and conversion means for coupling the power source to the electrodes, comprising:
    (a) a photo-electrically sensed pressure gauge connected to the output line of the generator,
    (b) a transistor controlled relay circuit responsive to the photo-electric sensor of the pressure gauge, and
    (c) means controlled by the relay circuit connected between the power source and the conversion means for regulating the current supplied to the electrodes of the hydrogen generator, whereby the generator current is regulated in response to the hydrogen output pressure.

2. A pressure responsive control circuit as defined in claim 1 wherein the photo-electrically sensed pressure gauge comprises:
    (a) a liquid filled U tube manometer having one end of the tube connected to the output line of the generator,
    (b) a light source disposed on one side of one arm of the tube,
    (c) a photocell disposed on the other side of the one arm of the tube opposite the light source, and
    (d) means for sliding the light source and photocell up or down the one arm of the tube together.

3. A pressure responsive control circuit as defined in claim 1 wherein the means recited in sub-paragraph (c) includes a potentiometer and a relay controlled switch connected in parallel.

4. A pressure responsive control circuit as defined in claim 1 wherein the power source is an alternating current source, and further comprising a power supply network connected between the power source and the relay circuit for supplying regulated DC power to the latter, and wherein the relay circuit comprises a transistor and a relay coil connected in series and the photo-electric sensor of the pressure gauge is connected to the base of the transistor.

5. A pressure responsive control circuit as defined in claim 4 wherein the photo-electrically sensed pressure gauge comprises:
    (a) a liquid filled U tube manometer having one end of the tube connected to the output line of the generator,
    (b) a light source disposed on one side of one arm of the tube, and
    (c) a photocell disposed on the other side of the one arm of the tube opposite the light source.

6. A pressure responsive control circuit as defined in claim 5 wherein the means recited in sub-paragraph (c) of claim 1 includes a potentiometer and a relay controlled switch connected in parallel.

References Cited

UNITED STATES PATENTS

| | | | |
|---|---|---|---|
| 2,118,029 | 5/1938 | Boyd | 73—401 XR |
| 2,555,674 | 6/1951 | Carrick | 73—432 XR |
| 2,875,141 | 2/1959 | Noyce | 204—228 XR |
| 3,336,215 | 8/1967 | Hagen | 204—230 |

FOREIGN PATENTS 742,201   9/1966   Canada.

JOHN H. MACK, Primary Examiner

D. R. VALENTINE, Assistant Examiner

U.S. Cl. X.R.

73—432; 204—228